(12) United States Patent
Lindblad et al.

(10) Patent No.: US 8,747,281 B2
(45) Date of Patent: Jun. 10, 2014

(54) BRAKE ASSEMBLY FOR POWER-DRIVEN HAND-HELD CUTTING DEVICE

(75) Inventors: Johan Lindblad, Jönköping (SE); Björn Rosberg, Jönköping (SE); Morgan Svensson, Huskvarna (SE)

(73) Assignee: Husqvarna AB, Huskvarna (SE)

(*) Notice: Subject to any disclaimer, the term of this patent is extended or adjusted under 35 U.S.C. 154(b) by 0 days.

(21) Appl. No.: 14/117,766

(22) PCT Filed: Feb. 15, 2012

(86) PCT No.: PCT/SE2012/050162

§ 371 (c)(1),
(2), (4) Date: Nov. 14, 2013

(87) PCT Pub. No.: WO2013/122518

PCT Pub. Date: Aug. 22, 2013

(65) Prior Publication Data

US 2014/0080672 A1    Mar. 20, 2014

(51) Int. Cl.
*F02D 9/06* (2006.01)
*B23D 57/02* (2006.01)
*B27B 17/08* (2006.01)

(52) U.S. Cl.
CPC ................... *B27B 17/083* (2013.01)
USPC ............................................ 477/204; 30/382

(58) Field of Classification Search
CPC ...... B27G 19/00; B27G 19/003; B27B 17/00; B27B 17/08; B27B 17/083
USPC ........................................................ 477/204
See application file for complete search history.

(56) References Cited

U.S. PATENT DOCUMENTS 5,915,795 A    6/1999   Nakamura et al.
6,135,920 A *  10/2000  Kamiya et al. ................ 477/185

(Continued)

FOREIGN PATENT DOCUMENTS

| CN | 201282664 Y | 8/2009 |
| DE | 3324628 A1  | 1/1985 |
| EP | 1749626 A1  | 2/2007 |

OTHER PUBLICATIONS

International Search Report and Written Opinion of PCT/SE2012/050162 mailed Sep. 10, 2012, all enclosed pages cited.

*Primary Examiner* — Dirk Wright
(74) *Attorney, Agent, or Firm* — Nelson Mullins Riley & Scarborough LLP

(57) ABSTRACT

A brake assembly (1) for a hand-held power-driven cutting device (2) is provided comprising a movably arranged lever (14), at least being movable between a first- and a second position, a brake member (16), and a brake element (20) connected to or forming one unit with a rotatable part (22) of a transmission of the cutting device (2), wherein the brake member (16) is movable between a non-activated position and an activated position, and wherein the brake member (16) is arranged to engage with the brake element (20) in the activated position to prevent rotation of the rotatable part (22). The brake assembly (1) further comprising a holding mechanism (23) arranged to hold the brake member (16) in the non-activated position when the lever (14) is in the first position, and a first resilient element (18) arranged to bias the brake member (16) towards the activated position, and wherein the brake member (16) is arranged to be released from the holding mechanism (23) as a response to the lever (14) coming into the second position, and wherein when released the brake member (16) is adapted to be forced towards the activated position by means of the first resilient element (18), and wherein the brake member (16) is arranged to engage with a structure (34) of the brake element (20) in said activated position so as to prevent rotation of the brake element (20).

15 Claims, 5 Drawing Sheets

(56) References Cited

U.S. PATENT DOCUMENTS

| | | | |
|---|---|---|---|
| 8,326,520 B2 * | 12/2012 | Bollig et al. | 701/113 |
| 8,521,386 B2 * | 8/2013 | Hiyoshi et al. | 701/70 |
| 2009/0193669 A1 * | 8/2009 | Gorenflo | 30/382 |
| 2014/0005001 A1 * | 1/2014 | Karrar | 477/204 |

* cited by examiner

BRAKE ASSEMBLY FOR POWER-DRIVEN HAND-HELD CUTTING DEVICE

TECHNICAL FIELD

The present invention relates to a brake assembly for a power-driven hand-held cutting device. The invention further relates to a chainsaw comprising a brake assembly.

BACKGROUND

With a power-driven hand-held cutting device, an operator may e.g. cut or saw vegetation, such as trees, bushes, branches, grass, etc. Many power-driven hand-held cutting devices today are equipped with some sort of brake assembly. Such brake assembly may include a hand guard arranged to activate a brake. When such assembly is used in the technical field of chainsaws, the assembly may be referred to as kick back safety assembly, chain brake assembly, or kick back guard. Such assembly is arranged to hinder rotation of a rotatable part of a transmission of the chain saw to thereby hinder the movement of the chain if the guide bar of the chainsaw is kicked towards a user. Since the assembly is intended to protect a user from being injured by a moving chain, there are various requirements on such assembly. For instance, when the hand guard reaches a position in which the brake is intended to be activated, the brake must be activated with high reliability. Further, the brake must stop the chain as soon as possible in order to avoid injury of the user.

Attempts have been made to provide a brake assembly for a power driven cutting apparatus, for example a brake assembly for a chainsaw as described in the document U.S. Pat. No. 3,664,390 A. The saw described in this document has a hand guard arranged between a handle of the chainsaw and the guide bar. In case the chainsaw kicks back, the hand guard is pushed to a position, usually by the upper side of a user's hand, in which position the brake assembly is activated. The brake assembly is associated with a number of drawbacks. For example, after the brake has been activated, the brake may unintentionally be inactivated.

A conventional kick back brake for a chainsaw uses a brake band wound around a brake drum, which brake drum is fixedly connected to a drive sprocket for driving a cutting chain. Upon kick back a hand guard is pivoted and thereby arranged to activate the kick back brake. By activation of the brake one end of the brake band is pulled and thus tightened around the brake drum so that the drum and thus the chain stops.

SUMMARY

An object of the present invention is to provide an improved brake assembly for a power-driven hand-held cutting device which is e.g. reliable and robust and which provides for a quick stop of a cutting tool of the cutting device.

According to an aspect of the invention, this object is achieved by a brake assembly for a hand-held power-driven cutting device comprising a movably arranged lever, at least being movable between a first- and a second position, a brake member, and a brake element connected to or forming one unit with a rotatable part of a transmission of the cutting device, wherein the brake member is movable between a non-activated position and an activated position, and wherein the brake member is arranged to engage with the brake element in the activated position to prevent rotation of the rotatable part. The brake assembly further comprising a holding mechanism arranged to hold the brake member in the non-activated position when the lever is in the first position, and a first resilient element arranged to bias the brake member towards the activated position, and wherein the brake member is arranged to be released from the holding mechanism as a response to the lever coming into the second position, and wherein when released the brake member is adapted to be forced towards the activated position by means of the first resilient element, and wherein the brake member is arranged to engage with a structure of the brake element in said activated position so as to prevent rotation of the brake element.

This, since such brake assembly permits greater tolerance deviations of the components of the assembly. Further, the braking action is very quick e.g. because of the brake member being biased towards the activated position.

The transmission, comprising the rotatable part, is arranged to transmit power from a driving motor to a cutting tool of the cutting device. The driving motor may comprise an electric motor or a combustion engine. The transmission may comprise a drive shaft of the motor, and a clutch arranged between the drive shaft and the rotatable part. The rotatable part may be in the form of a drive sprocket or a spur gear and may transmit a rotating motion from the motor to a motion of the cutting tool of the cutting device. The brake element is connected with the rotatable part. The transmission may further comprise a bevel gear, and/or a speed reduction gear, and/or a belt- or a cord-drive holding mechanism and/or, a clutch holding mechanism, or any other form of holding mechanism that may transmit a rotating motion from the motor to a motion of the cutting tool. The transmission may translate a direction and/or angle of rotation from the motor to a different direction and/or angle of rotation of the cutting tool.

The first resilient element may comprise a spring, a pretensioned spring, a rubber element, or a torsion spring or any other form of resilient element that may bias the brake member in a direction towards the activated position.

According to some embodiments, the holding mechanism may comprise a cam portion comprising a cam surface adapted to engage with the brake member at least in the non-activated position. By the engagement, the holding mechanism may hold the brake member in the non-activated position when the lever is in the first position. As an alternative to a cam surface, any other structure may be provided to permit an engagement between the cam portion and the brake member.

The features first position and second position of the lever encompass discrete first and second positions as well as distance intervals for the first and second positions. In the latter case, the lever may be moved a certain distance within one of the first and/or second position without entering the other position. For example, if the lever is in the first position, the lever may be moved within the first position without the brake member being released by the holding mechanism.

As mentioned above, when the brake member engages with the brake element in the activated position, the rotation of the rotatable part is hindered. Since the rotatable part is connected to the cutting tool via the transmission, a movement of the cutting tool is hindered when the rotation of the rotatable part is hindered. According to some embodiments, a hindering of rotation of the rotatable part may result in a hindering of rotation of the motor due to a connection between the rotatable part and the motor.

According to some embodiments, the connection between the brake element and the rotatable part may comprise a resilient assembly, such as a torsion spring. The resilient assembly may permit an angular displacement between the brake element and the rotatable part such that when the brake member engages with the brake element, the rotation of the rotatable part is not abruptly hindered. As an alternative, the brake element may be fixed in relation to the rotatable part or may form a part of the rotatable part. The transmission may comprise a resilient assembly arranged between the rotatable part and the tool and/or may comprise a resilient assembly arranged between the rotatable part and the motor.

According to some embodiments, the brake assembly may comprise a switch arranged to switch off a driving motor of the cutting device when the brake member is displaced from the deactivated position. Since the rotatable part is arranged to be driven by the motor, switching off the motor may facilitate the hindering of the rotation of the rotatable part. Also, switching off the motor may protect the motor from being overheated. Embodiments wherein the brake assembly comprises a switch encompass the switch being physically affected by the brake member as well as the switch being indirectly affected by the brake member as well as being affected by a change of position of the brake member or the lever. In embodiments wherein the motor comprises a combustion engine, the switch may be arranged to switch off the ignition of the combustion engine and in embodiments wherein the motor comprises an electrical motor the switch may be arranged to switch off the electric power of the motor.

The brake member may be arranged substantially rectilinearly movable between the activated and deactivated position. As an alternative, the brake member may be rotatably arranged such that the brake member may be angularly displaced between the activated and deactivated position.

According to some embodiments, the lever may be hinged around a pivot axis. In such embodiments, the lever may be angularly displaced, e.g. between the first and second position. As an alternative, the lever may be slidably arranged. In such embodiments, the lever may be displaced along a substantially straight direction, e.g. between the first and second position. According to further embodiments, the lever may be slidably arranged along a curved path such that the lever may be displaced, e.g. between the first and second position, along the curved path.

According to some embodiments, a chain saw constitutes the hand-held power-driven cutting device. In such embodiments, the cutting tool comprises a chain. The chain may be driven by an electric motor or a combustion engine via a transmission comprising the rotatable part. According to alternative embodiments, a grinding tool, an ending tool, a circular saw or a hedge trimmer constitutes the hand-held power-driven cutting device. The invention is not limited to these exemplified cutting devices but may be utilized in any cutting device wherein a cutting tool requires to be hindered in certain situations.

According to some embodiments, a mechanical link may be formed between the lever and the brake member. In such embodiments, a movement of the lever may be transmitted by the mechanical link to a movement of the brake member. The mechanical link may comprise a linkage, a ball joint, a wire, or any other form of arrangement that may transmit a movement of the lever to a movement of the brake member. As an alternative to a mechanical link, an electrical arrangement may be provided to form an electrical link between the lever and the brake member such that a movement of the lever may be transmitted to a movement of the braking member.

According to some embodiments, a movement of the lever from the first position towards the second position is transmitted via the mechanical link to the brake member such that the brake member is released by the holding mechanism such that the brake member is further displaced by a force of the first resilient element to the activated position. Thus, a movement of the lever, towards the second position may trigger a movement of the brake member towards the activated position.

According to some embodiments, the lever may be biased towards the second position. The lever may be biased towards the second position by a third resilient element such as a spring and/or a pre-tensioned spring, and/or a torsion spring, and/or a pre-tensioned torsion spring, and/or a rubber material.

According to some embodiments, the mechanical link permits the brake member to be displaced from the activated position to the non-activated position when the lever is moved from the second position to the first position. Consequently, according to such embodiments, an operator of a cutting device may move the lever from the second position to the first position to thereby deactivate the brake. Accordingly, the operator may apply a force to the lever in a direction towards the first position in order to deactivate the brake. Hence, according to some embodiments, a deactivation of the brake may only be performed intentionally by an operator by applying a force to the lever.

According to a further aspect of the invention there is provided a chainsaw comprising a brake assembly according to aspects and embodiments disclosed herein. According to some embodiments, the lever comprises a hand guard.

Further features of, and advantages with, the present invention will become apparent when studying the appended claims and the following detailed description. Those skilled in the art will realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully with reference to the accompanying drawings, in which example embodiments are shown. However, this invention should not be construed as limited to the embodiments set forth herein. Disclosed features of example embodiments may be combined as readily understood by one of ordinary skill in the art to which this invention belongs. Like numbers refer to like elements throughout.

Well-known functions or constructions will not necessarily be described in detail for brevity and/or clarity.

Figure 1:
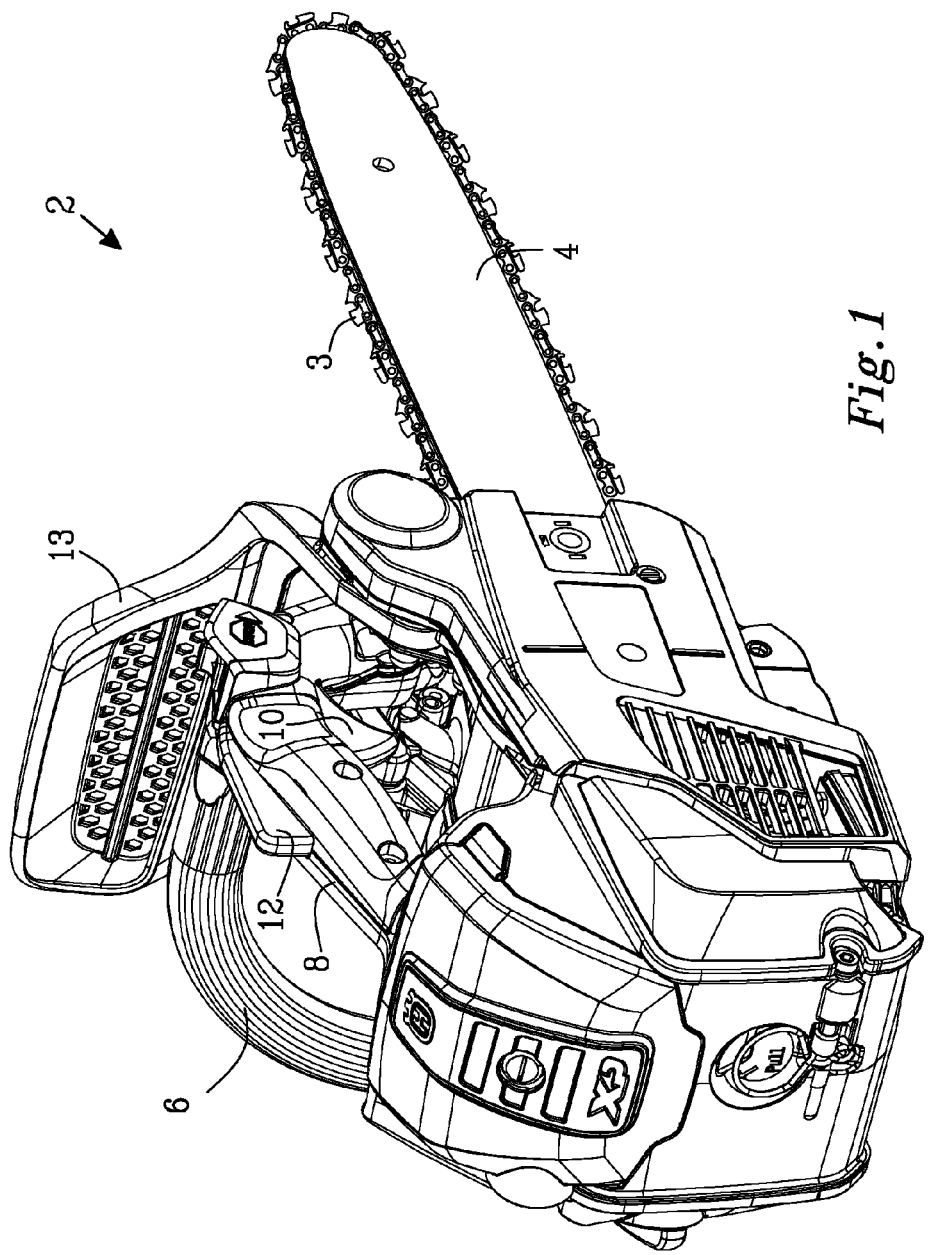
FIG. 1 illustrates a hand-held power-driven cutting device according to some embodiments.

FIG. 1 illustrates a hand-held power-driven cutting device 2 according to some embodiments. The cutting device 2 is provided in the form of a motor-driven chainsaw 2. The chainsaw 2 comprises a cutting tool 3 in form of a cutting chain 3 movably arranged around a guide bar 4. The cutting chain 3 may be provided with cutting teeth and is arranged to be driven by a motor, e.g. an electrical motor or a combustion engine, via a transmission comprising a rotatable part 22 (illustrated in FIG. 2). In addition to the rotatable part 22, the transmission may comprise a drive shaft 200 of the motor and a clutch 201, the drive shaft 200 being coupled to the rotatable part 22 via the clutch 201. The rotatable part 22 may be in the form of a drive sprocket 22 or a spur gear, or any other means for driving the cutting chain 3. The chainsaw 2 further comprises a front handle 6, preferably of a bail type, and a rear handle 8. The rear handle 8 may be of a top handle type as illustrated in FIG. 1, but may as well be of rear handle type. The second handle 8 is provided with a throttle lever 10 and a throttle locking lever 12. The throttle lever 10 may be used to regulate power of the motor. The throttle locking lever 12 may be arranged in connection with a mechanism to lock the throttle lever 10 in an idling position. I.e., for being able to regulate power of the motor by means of said throttle lever 10, the throttle locking lever 12 must be displaced to a position wherein the throttle lever 10 is unlocked. When locked by said mechanism, the throttle lever 10 is preferably mechanically prevented from being pulled. The chainsaw 2 further comprises a brake assembly 1 (not shown in FIG. 1) comprising a lever 14 in the form of a hand guard 14. The hand guard 14 is arranged to be moveable between a first position and a second position. The brake assembly 1 is arranged to protect a user from being injured e.g. in case the chainsaw 2 kicks back towards the user. That is, in case the chainsaw 2 kicks back, a hand of a user holding the first handle 6, or inertial forces acting on the hand guard 14, may reposition the hand guard 14 from the first position to the second position to thereby activate the brake assembly 1. When the brake assembly 1 is activated, a rotation of the rotatable part 22 of the transmission is hindered such that a movement of the chain 3 is prevented. In this manner, the user is protected in case the chainsaw 2 kicks back. The clutch 201 arranged between the rotatable part 22 and drive shaft 200 of the motor may permit a continued rotation of the motor when the brake assembly 1 is activated. The clutch 201 is preferably of a slip clutch type.

Figure 2:
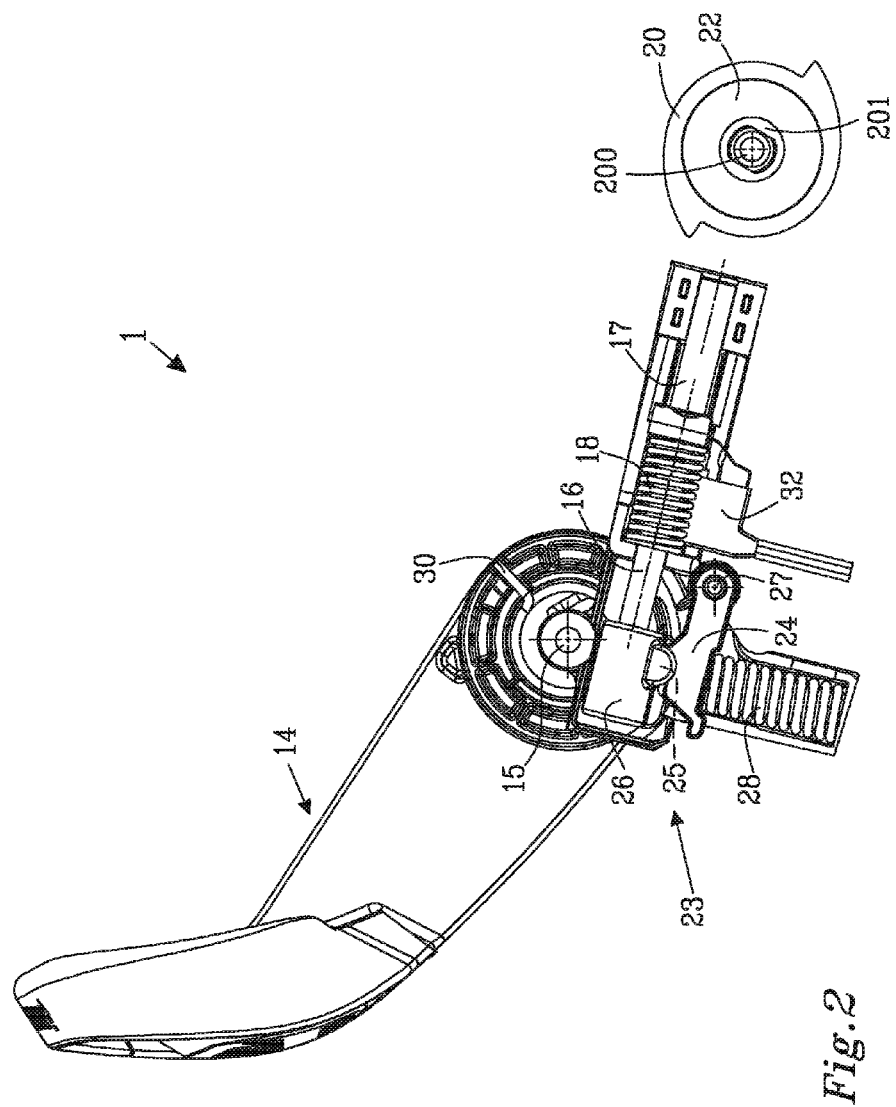
FIG. 2 illustrates a brake assembly comprising a brake member in a deactivated position according to some embodiments.

FIG. 2 illustrates the brake assembly 1 comprising a brake member 16 in a locked non-activated position according to some embodiments. The brake member 16 comprises an elongated shaft 17 and is preferably linearly movably arranged between the locked position and an engaged activated position. The brake member 16 is biased by a first resilient element 18, in the form of a compression spring 18, in a direction towards the engaged position. As an alternative to a compression spring, a tension spring or any other suitable biasing means could be arranged to bias the brake member 16 in a direction towards the engaged position.

The brake assembly 1 further comprises the lever 14 arranged to be pivotably moveable between a first non-activated position and a second activated position. In these embodiments, the lever 14 is pivotable about a first pivot axis 15. The lever 14 is illustrated in FIG. 2 in the first position, i.e. in the non-activated position. A holding mechanism 23 holds the brake member 16 in the locked position when the lever 14 is in said first position. A cam portion 24 of the holding mechanism 23 comprises a cam surface 25. The brake member 16 comprises a connecting portion 26 which in turn comprises a slot 40 (shown in FIG. 4). In the locked position, the cam surface 25 engages with the connecting portion 26 in the slot 40 such that the brake member 16 is held in the locked position. When the brake member 16 is in the locked position, a rotation of a brake element 20 is allowed.

The brake element 20 is connected, preferably rigidly connected, with the rotatable part 22 of the transmission of the cutting device 2. Preferably, the brake element 20 forms a non-separable component 20, 22 with the rotatable part 22. Alternatively, the brake element 20 and the rotatable part 22 are releasably fixed. The rotatable part 22 preferably comprises the drive sprocket 22 arranged to drive the cutting tool 3 of the cutting device 2, and the transmission may comprise the clutch 201 arranged between the drive shaft 200 of the motor of the cutting device 2 and the rotatable part 22. The clutch 201 may permit a continued rotation of the drive shaft 200 when a rotation of the rotatable part 22 is hindered, i.e. when the brake element 20 is engaged by the brake member 16. When the brake member 16 is in the non-activated position, a rotation of the rotatable part 22 of the transmission is allowed and thus also a motion of the cutting tool 3.

A mechanical link (not shown in FIG. 2) is formed between the lever 14 and the brake member 16. Thus, upon a movement of the lever 14, from the first position to the second position, movement is transmitted by the mechanical link to the brake member 16 such that the brake member 16 is released from the holding mechanism 23. When released from the holding mechanism 23, a force of the resilient element 18 is allowed to cause movement of the brake member 16 towards the activated position of the brake member 16, i.e. towards engagement between the brake member 16 and the brake element 20.

The cam portion 24 is preferably hinged around a second pivot axis 27 and is biased towards the brake member 16, or more specifically towards the connecting portion 26, by a second resilient element 28, e.g. a spring 28, preferably a compression spring 28. The second resilient element 28 thus may form part of the holding mechanism 23. As an alternative to the pivotal arrangement of the cam portion 24, the cam portion 24 may be arranged to be substantially linearly movable. The biasing of the cam portion 24 towards the brake member 16 may control the engagement of the cam portion 24 with the brake member 16 such that a releasing force required to release the brake member 16, inter alia is at least partially determined by the second resilient element 28. Further, the characteristics of the cam portion 24 and the connecting portion 26 of the brake member 16 may at least partially determine the force required to be applied to the lever 14 to displace the lever 14 from the first position to the second position to thereby release the brake member 16 from the non-activated position. Further, the lever 14 may be biased by a third resilient element 30, e.g. by a torsion spring 30, towards the second position of the lever 14.

Accordingly, the force required to be applied to the lever 14 to move it from the first to the second position may be determined by the characteristics of the cam portion 24 and the connecting portion 26 in combination with the spring force of the first resilient element 18, the second resilient element 28, and the third resilient element 30.

The brake assembly 1 comprises a switch 32 arranged to switch off the driving motor of the cutting device 2 when the brake member 16 is displaced from the non-activated position. The feature 'displaced from the non-activated position' is intended to encompass the brake member 16 being displaced from the non-activated position, as well as being displaced towards the activated position or the brake member 16 being in the activated position. The brake member 16 in FIG. 2 is illustrated in the non-activated position. In this position, the switch 32 is adapted not to switch off the driving motor. Preferably, the switch 32 is activated when the brake member 16 is in the non-activated position, wherein the switch 32 is adapted not to switch off the driving motor when being activated. According to some embodiments an indicator may be activated when the brake member 16 is displaced from the non-activated position. Preferably, the indicator is coupled to the switch 32 such that switching off of the switch 32 activates said indicator. The indicator may comprise an indication symbol such as a signal lamp, or may comprise a message shown in a display, or may comprise an audio signal produced by a speaker.

Figure 3:
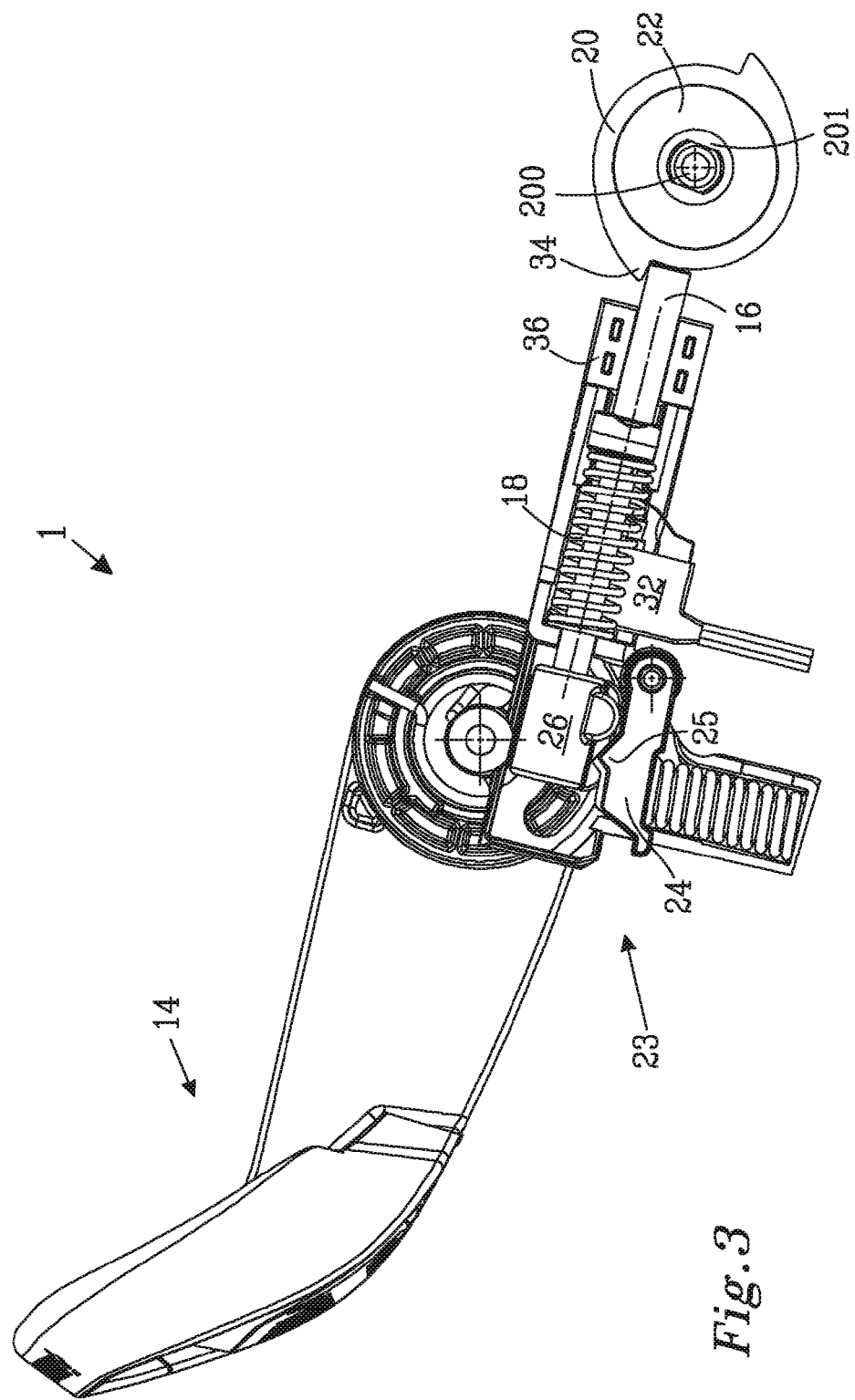
FIG. 3 illustrates the brake assembly of FIG. 2 in an activated position.

FIG. 3 illustrates the brake assembly 1 of FIG. 2 in an activated position. In FIG. 3, the lever 14 is illustrated in the second position and the holding mechanism 23 has released the brake member 16 such that the brake member 16 has been displaced, by the biasing of the first resilient element 18, to the activated position. That is, when the lever 14 has been moved from the first position to the second position a motion of the lever 14 is transmitted to the brake member 16 by a mechanical link between the lever 14 and the brake member 16 such that the connecting portion 26 of the brake member 16 disengages from the cam surface 25 of the cam portion 24 of the holding mechanism 23. The cam surface 25 may comprise a protrusion with a front and a rear wall, which walls may form an angle of between 60° and 120° as seen in a cross sectional view of the cam portion along a plane perpendicular to the pivot axis 15. The connecting portion 26 is engaged with the front wall in the non-activated position of the brake member 16 and disengages from the front wall, when the lever 14 has been moved from the first position to the second position. The biasing of the brake member 16 towards the activated position ensures that the brake member 16 is further displaced towards the activated position. In the activated position, the brake member 16 engages with the brake element 20 such that rotation of the brake element 20 and the rotatable part 22 is hindered. The clutch 201 may be arranged between the drive shaft 200 of the motor and the brake element 20, such that a continued rotation of the motor is allowed when the brake member 20 engages with the brake member 16. The brake element 20 may be in the form of a brake ring 20 and the rotatable part 22 may be in the form of a drive sprocket 22 or a spur gear. Due to the biasing of the brake member 16 towards the brake element 20, a secure engagement between these parts is achieved. Consequently, a secure brake assembly 1 is provided wherein an engagement between the brake member 16 and the brake element 20 is ensured as soon as the brake assembly 1 has been activated. The brake element 20 is provided with an engaging structure in the form of two shoulders 34, or projections, arranged to abut against the brake member 16 in the activated position. Alternatively, the brake element 20 may be provided with one or more than two shoulders 34, or projections, extending radially relative to the drive shaft 200. The brake element 20 may comprise the brake ring 20. As an alternative to a shoulder, the brake element 20 may be provided with other structures such as an opening, a slot, a recessed portion, a friction surface, or any other structure intensifying the hindering of the rotation of the brake element 20 and the rotatable part 22.

A force receiving structure 36 is arranged to receive a force or a torque applied by the brake element 20 to the brake member 16 in the activated position. The force receiving structure 36 may be formed by a sleeve 36 enclosing a part of the brake member 16 such that the brake member 16 is movably arranged in relation to the sleeve 36. The force receiving structure 36 may be stationary arranged in relation to the cutting device 2. As an alternative, the force receiving structure 36 may be resiliently suspended in relation to the cutting device. As a further alternative, the part of the brake member 16 may be partially surrounded by the force receiving structure 36. The brake assembly 1 comprises the switch 32 arranged to switch off the motor of the cutting device when the brake member 16 is displaced from the deactivated position. Preferably, the switch 32 is arranged to switch off the motor as long as the brake member 16 is in the activated position.

According to some embodiments, the mechanical link permits the brake member 16 to be displaced from the actuated position to the non-activated position, i.e. deactivation of the kick back brake, when the lever 14 is moved from the second position to the first position. Consequently, according to such embodiments, an operator of a cutting device 2 may apply a force to the lever 14, e.g. by his/her hand, in a direction towards the first position to thereby displace the brake member 16 in a direction towards the non-activated position. When the brake member 16 reaches the non-activated position, the connecting portion 26 engages with the cam portion 24 of the holding mechanism 23 such that the holding mechanism 23 holds the brake member 16 in the non-activated position.

Figure 4:
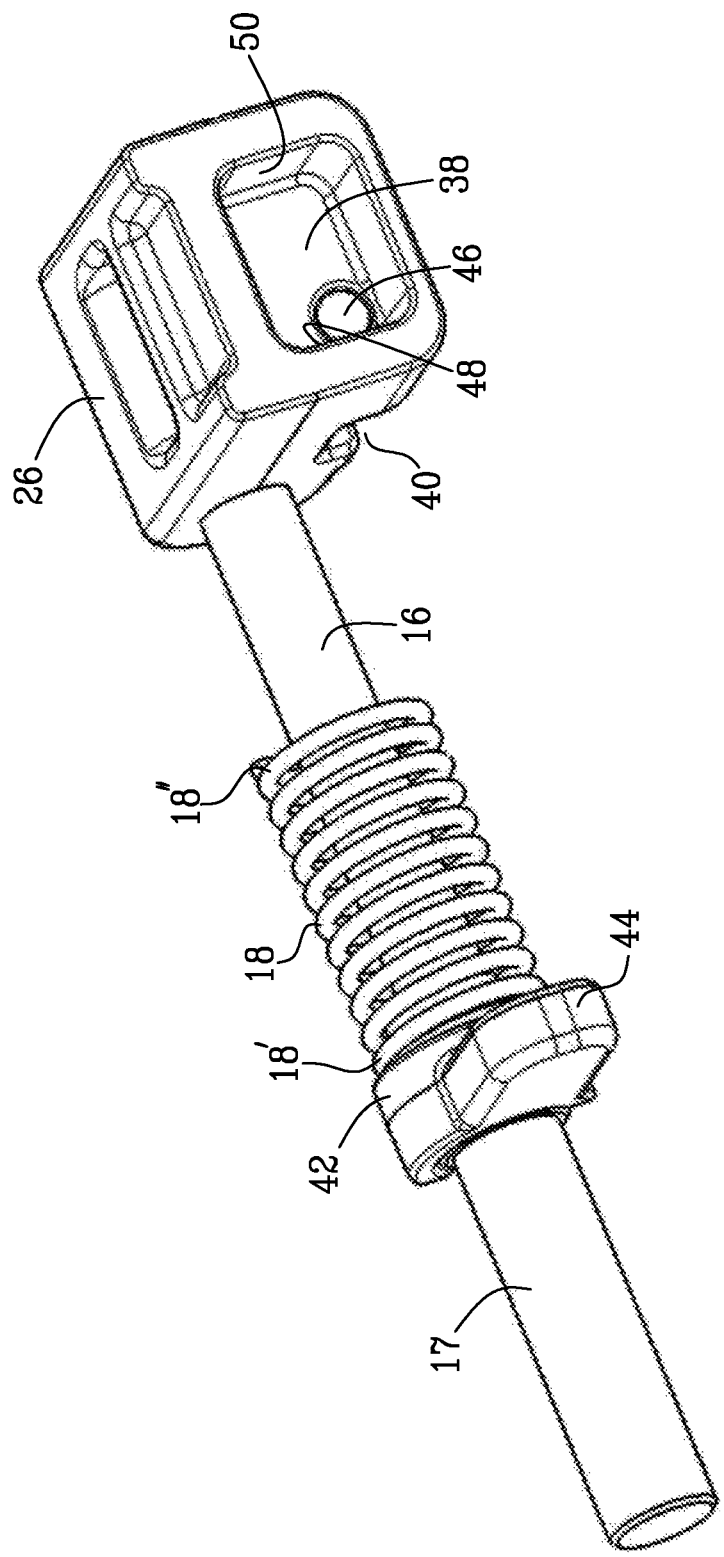
FIG. 4 illustrates a brake member according to some embodiments.

FIG. 4 illustrates the brake member 16 according to some embodiments. The brake member 16 forms a part of the brake assembly 1 for the hand-held power-driven cutting device 2. The brake member 16 comprises the elongated shaft 17 and has an activated position and a non-activated position. The brake member 16, or more specifically the elongated shaft 17, is arranged to engage with the brake element 20 in the activated position to hinder rotation of the rotatable part 22 of the transmission of the cutting device 2. The first resilient element 18 in the form of a compression spring 18 is arranged to bias the brake member 16 in a direction towards the activated position. As an alternative, a tension spring could be arranged to bias the brake member 16 in a direction towards the activated position. The first resilient element 18 comprises a first end 18' and a second end 18". The first end 18' abuts against a support portion 42 of the brake member 16 and the second end 18" abuts against a surface which is stationary in relation to the cutting device (not shown in FIG. 4), such that the brake member 16 is biased towards the activated position. The brake member 16 comprises the connecting portion 26. The connecting portion 26 comprises the slot 40. The connecting portion 26 is adapted to engage with the cam surface 25 of the cam portion 24 of the holding mechanism 23. The engagement between the cam surface 25 and the connecting portion 26 holds the brake member 16 in the non-activated position. The connecting portion 26 may be formed from a plastic material. The elongated shaft 17 is preferably formed by a harder material, such as steel. The connecting portion 26 further comprises a reinforcement part 46. A surface portion of the reinforcement part 46 forms at least part of a contact surface of the connecting portion 26 in the slot 40 to thereby further ensure the engagement between the connecting portion 26 and the cam surface 25 of the cam portion 24. The reinforcement part 46 may also protect the slot 40 from wearing. The slot 40 may guide the cam surface 25 of the cam portion 24 of the holding mechanism 23 to the surface portion of the reinforcement part 46.

The connecting portion 26 of the brake member 16 is provided with a cavity 38. The cavity 38 is adapted to receive a force transmitting structure 52 arranged in connection with the lever 14 such that a mechanical link is formed between the lever 14 and the brake member 16. The force transmitting structure 52 may comprise a pin 52 (illustrated in FIG. 5) extending into the cavity 38 of the brake member 16. When the brake member 16 is in the non-activated position, a force applied by the force transmitting structure 52 to a first wall 48 inside the cavity 38 may displace the brake member 16 such that the brake member 16 is released from the holding mechanism 23. The biasing of the brake member 16 in a direction towards the activated position by the first resilient element 18 ensures that the brake member 16 is displaced to the activated position. Likewise, when the brake member 16 is in the activated position, a force applied by the force transmitting structure to a second wall 50 in the cavity 38 may displace the brake member 16 in a direction towards the non-activated position. When the brake member 16 reaches the non-activated position, the cam surface 25 of the cam portion 24 engages with the connecting portion 26 in the slot 40 such that the brake member 16 may be held in the non-activated position.

In such embodiments the cavity 38 may permit a movement of the force transmitting structure 52 within the cavity 38 so as to create a play or clearance in the mechanical link. The play in the mechanical link may thus permit a movement of the lever 14 without the movement being transferred to the brake member 16. The size of the cavity 38 and the force transmitting structure 52 may thus determine the size of the play. According to some embodiments, the lever 14 may be hinged around the first pivot axis 15 and the force transmitting structure 52 of the lever 14 is positioned at a radius from the first pivot axis 15, and the mechanical link may be formed between the force transmitting structure 52 of the lever 14 and the brake member 16. In embodiments wherein the lever 14 is hinged around the first pivot axis 15 and the force transmitting structure 52 is positioned at a radius from the first pivot axis 15, both the lever 14 and the force transmitting structure 52 will obtain an angular movement when the lever 14 is displaced.

Consequently, the cavity 38 and the force transmitting structure 52 are designed to permit an angular movement of the force transmitting structure 52 within the cavity 38.

I.e., in a non-activated state of the kick back brake the lever 14 may be moved an angular distance towards the second position of the lever 14 without the brake member 16 being released from the holding mechanism 23. This permits tolerance deviations among the components of the brake assembly. Further, in said non-activated state, in the first position for the lever 14, the lever 14 may be moved an angular distance further away from the second position, i.e. towards the operator of the cutting device, and this without causing movement of the brake member 16. The latter not only permits tolerance deviations, but may also protect the switch 32 from being damaged by the flange 4 pressing too hard against the switch 32, when a force being applied to the lever 14 in the direction towards the operator. The lever may be subject to such force when deactivating the kick back brake by pulling the lever 14 towards the operator. Also, the lever 14 may be subject to such force especially if the cutting device 2 is a chainsaw, since e.g. twigs and branches may then hit the hand guard 14 during operation.

In an activated state of the kick back brake there may be play in both directions of the lever 14, which is favourable in terms of allowing greater tolerance deviations of the components of the brake assembly. Also, it is favourable to have a play in the direction towards the first position of the lever 14 to ensure that the brake member 16 is not moved from the engaged position with the brake element 20, i.e. to ensure that the brake member 16 and element 20 stay fully engaged after the kick back brake has been activated.

According to a preferred embodiment the lever 14 at least has play in the rotational direction towards a body portion of the cutting device, or towards the operator of the cutting device, or towards the first handle 6.

As mentioned above in connection with FIG. 2, the switch 32 may be actuated by the brake member 16. In such embodiments, the brake member 16 may comprise the flange 44. The flange 44 may be adapted to activate or deactivate the switch 32 when the brake member 16 is displaced. For example, the switch 32 may be arranged to switch off a driving motor of the cutting device 2 when the brake member 16 is displaced from the non-activated position. Further, the flange 44 or a portion thereof may be a part of the switch 32, such that the switch 32 is turned off when the brake member 16 is displaced from the non-activated position towards the activated position.

Figure 5:
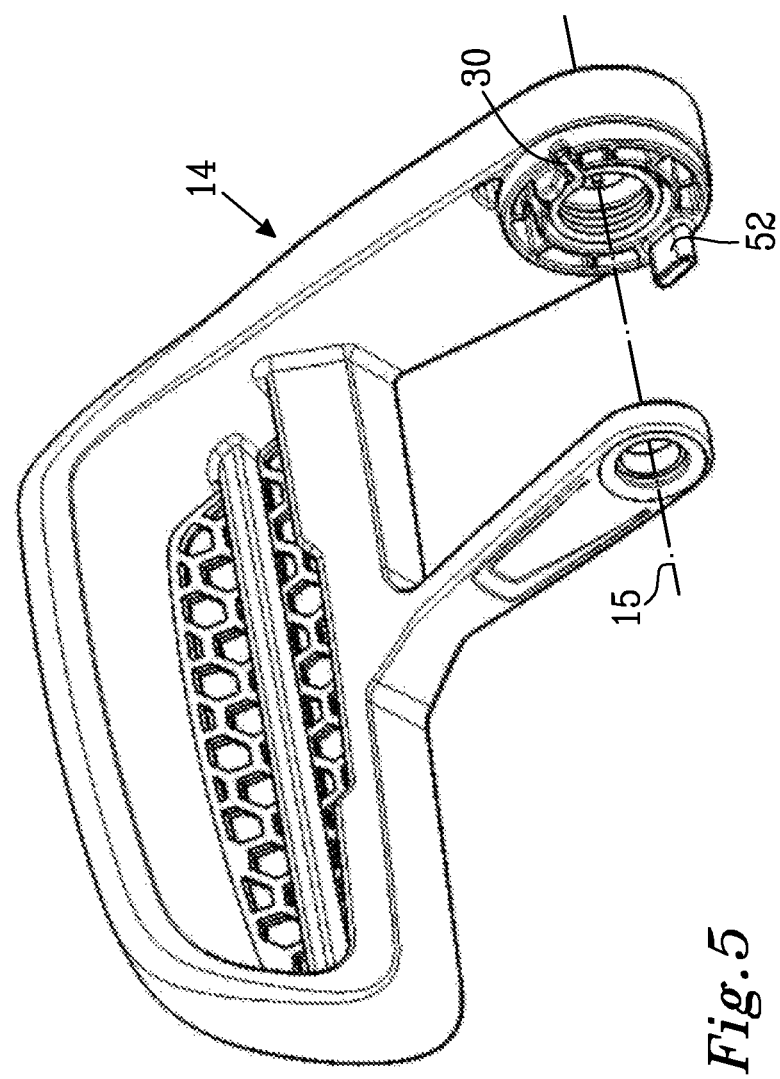
FIG. 5 illustrates a lever according to some embodiments.

FIG. 5 illustrates the lever 14 according to some embodiments. The lever 14 is hinged around the first pivot axis 15 and comprises the third resilient element 30 biasing the lever 14 towards the second position. The lever 14 comprises the force transmitting structure 52 adapted to extend into the cavity 38 of the brake member 16. The force transmitting structure 52 is positioned at a radius from the pivot axis 15. The force transmitting structure 52 extending into the cavity 38 of the connecting portion 26 of the brake member 16 (see FIG. 4) forms a mechanical link between the lever 14 and the brake member 16. When the lever 14 is being displaced from the first position to the second position, the force transmitting structure 52 applies a force to a first wall 48 in the cavity 38 such that the brake member 16 is displaced in a manner such that the brake member 16 is released from the holding mechanism 23. Likewise, when the lever 14 is displaced from the second position, a force applied by the force transmitting structure 52 to the second wall 50 in the cavity 38 may displace the brake member 16 in a direction towards the non-activated position. The force transmitting structure 52 has an elongated shape as seen in cross section along a plane perpendicular to the drive shaft 200, or as seen in cross section in a plane perpendicular to the pivot axis 15. As mentioned above in connection with FIG. 4, both the lever 14 and the force transmitting structure 52 will obtain an angular movement when the lever 14 is displaced. The elongated shape of the force transmitting structure 52 may allow an angular movement of the force transmitting structure 52 within the cavity 38. Accordingly, the force transmitting structure 52 may transmit an angular movement of the lever 14 to a substantially linear movement of the brake member 16. Preferably, a movement of the structure 52 is permitted at least in one rotational direction within the cavity 38 without essentially abutting any of the inner walls of the cavity 38, so as to cause the previously mentioned play in the mechanical link between the lever 14 and the brake member 16. According to embodiments for which the third resilient element 30 biases the lever 14 towards the second position, the force transmitting structure 52, or the protrusion 52, will rest against the second wall 50 of the cavity 38 of the brake member 16 in both the first and the second positions of the lever 14. In such embodiments, there will essentially only be a play for the lever 14 in the direction towards the body portion of the cutting device 2, or towards the operator. The range of play for the lever 14 is then essentially defined by a movement of the transmitting structure 52 within the cavity 38 between abutment with the second wall 50 and abutment with the first wall 48, and the resilient element 30 preferably being arranged to provide a resistance force against movement towards abutment with the first wall 48.

Although the invention has been described with reference to example embodiments, many different alterations, modifications and the like will become apparent for those skilled in the art. For instance, as an alternative to a holding mechanism 23 formed by a cam portion 24 provided with a cam surface 25 adapted to engage in a slot 40 of the brake member 16, any other locking mechanism could be provided that may hold the brake member 16 in a non-activated position when the lever 14 is in a first position and release the brake member 16 when the lever 14 is in a second position. For example, the holding mechanism 23 may be formed by an arrangement of parts forming a snap-function, such as a ball and a ball socket, or an arrangement of parts comprising friction engaging surfaces, and/or a magnetic arrangement. Further, the holding mechanism 23 may be formed by the brake member 16 provided with a cam surface and the cam portion provided with a slot. At least in some of these embodiments, the cam portion 24 of the holding mechanism 23 does not necessarily need to be biased towards the brake member 16.

As an alternative to a mechanical link formed between the lever 14 and the brake member 16, a link may be formed between the lever 14 and the holding mechanism 23. In such embodiments, the link may interact with the holding mechanism 23 to hold the brake member 16 in the deactivated position when the lever 14 is in the first position and may interact with the holding mechanism 23 to release the brake member 16 when the lever 14 is in a second position such that the brake member 16 may be displaced to the activated position. In embodiments wherein a mechanical link is formed between the lever 14 and the brake member 16 and in embodiments wherein a link is formed between the lever 14 and the holding mechanism 23 the link may comprise a linkage, a ball joint, a wire, or any other form of arrangement that may transmit a movement of the lever 14 to the holding mechanism 23 or to the brake member 16. As an alternative to a mechanical link, an electrical arrangement and/or a magnetic arrangement may be arranged to form a link between the lever 14 and the holding mechanism 23 or to form a link between the lever 14 and the brake member 16.

As used herein, the term "and/or" includes any and all combinations of one or more of the associated listed items.

The invention claimed is:

1. A brake assembly for a hand-held power-driven cutting device comprising:
   a movably arranged lever, at least being movable between a first- and a second position,
   a brake member, and
   a brake element connected to or forming one unit with a rotatable part of a transmission of the cutting device, wherein the brake member is movable between a non-activated position and an activated position, and wherein the brake member is arranged to engage with the brake element in the activated position to prevent rotation of the rotatable part, the brake assembly further comprising:
   a holding mechanism arranged to hold the brake member in the non-activated position when the lever is in the first position, and
   a first resilient element arranged to bias the brake member towards the activated position, and wherein the brake member is arranged to be released from the holding mechanism as a response to the lever coming into the second position, and wherein when released the brake member is adapted to be forced towards the activated position by means of the first resilient element, and wherein the brake member is arranged to engage with a structure of the brake element in said activated position so as to prevent rotation of the brake element.

2. A brake assembly according to claim 1, wherein the rotatable part comprises a drive sprocket or a spur gear arranged to drive a cutting tool of the cutting device.

3. A brake assembly according to claim 1, wherein the structure comprises at least one shoulder or recessed portion and the brake member comprises an elongated shaft, wherein the elongated shaft is adapted for engagement with the structure in the activated position.

4. A brake assembly according to claim 1, wherein the transmission comprises a drive shaft of a motor of the cutting device, the rotatable part, and a clutch, wherein the drive shaft is arranged to transmit rotation to the rotatable part via said clutch.

5. A brake assembly according to claim 4, wherein the clutch is a slip clutch and is adapted to allow rotation of the drive shaft relative to the rotatable part upon activation of the brake.

6. A brake assembly according to claim 1, wherein a force transmitting structure of the lever is adapted to transmit movement to the brake member as a response to the lever coming into the second position, and wherein the force transmitting structure is a protrusion extending into a cavity of the brake member.

7. A brake assembly according to claim 6, wherein the lever is pivotably arranged about a first pivot axis and the protrusion is positioned at a radius from the pivot axis of the lever and wherein the protrusion is arranged to be pressed against a first wall inside the cavity as a response to the lever coming into the second position and starting from the first position.

8. A brake assembly according to claim 7, wherein the protrusion is arranged to be pressed against a second wall inside the cavity as a response to the lever coming into the first position and starting from the second position.

9. A brake assembly according to claim 6, wherein the protrusion and the cavity are arranged such that a movement of the lever in the first position of the lever an angular distance further away from the second position of the lever is permitted without the force transmitting structure transmitting movement to the brake member.

10. A brake assembly according to claim 1, wherein the holding mechanism comprises a cam portion with a cam surface cooperating with a connecting portion of the brake member in the non-activated position of the brake member so as for the brake member to be releasably locked in the non-activated position.

11. The brake assembly according to claim 10, wherein the cam portion is biased towards the connecting portion via a biasing element (28).

12. The brake assembly according to claim 1, wherein the lever is biased towards the second position, at least via a torsion spring.

13. The brake assembly according to claim 1, wherein the brake assembly comprises a switch arranged to switch off a driving motor of the cutting device when the brake member is displaced from the non-activated position.

14. The brake assembly according to claim 13, wherein an indicator is arranged to be activated upon switching off of the switch.

15. A chainsaw comprising:
   a brake assembly including:
   a movably arranged lever, at least being movable between a first position and a second position,
   a brake member, and
   a brake element connected to or forming one unit with a rotatable part of a transmission of the cutting device, wherein the brake member is movable between a non-activated position and an activated position, and wherein the brake member is arranged to engage with the brake element in the activated position to prevent rotation of the rotatable part, the brake assembly further comprising:
   a holding mechanism arranged to hold the brake member in the non-activated position when the lever is in the first position, and a first resilient element arranged to bias the brake member towards the activated position, and wherein the brake member is arranged to be released from the holding mechanism as a response to the lever coming into the second position, and wherein when released the brake member is adapted to be forced towards the activated position by means of the first resilient element, and wherein the brake member is arranged to engage with a structure of the brake element in said activated position so as to prevent rotation of the brake element.

* * * * *